H. A. THIBERGE.
TRAP.
APPLICATION FILED DEC. 14, 1911.

1,025,845.

Patented May 7, 1912.

Witnesses
Edwin J. Beller.
Byron B. Collings.

Inventor
H. A. Thiberge.
Wilkinson, Fisher & Witherspoon
Attys

UNITED STATES PATENT OFFICE.

HARRY A. THIBERGE, OF NEW ORLEANS, LOUISIANA.

TRAP.

1,025,845.　　Specification of Letters Patent.　　Patented May 7, 1912.

Application filed December 14, 1911. Serial No. 665,759.

*To all whom it may concern:*

Be it known that I, HARRY A. THIBERGE, a citizen of the United States, residing at New Orleans, in the parish of Orleans and State of Louisiana, have invented certain new and useful Improvements in Traps; and I do hereby declare the following to be a full, clear, and exact description of the invention, such as will enable others skilled in the art to which it appertains to make and use the same.

My invention relates to an improved animal trap, and it consists in the constructions, combinations, and arrangements hereinafter described and claimed.

An object of my invention is to provide an improved device adapted to trap and securely confine animals without killing the latter.

A further object of my invention is to provide a simple and inexpensive trap especially adapted for rats or mice, which will be durable and certain in operation.

Figure 1:
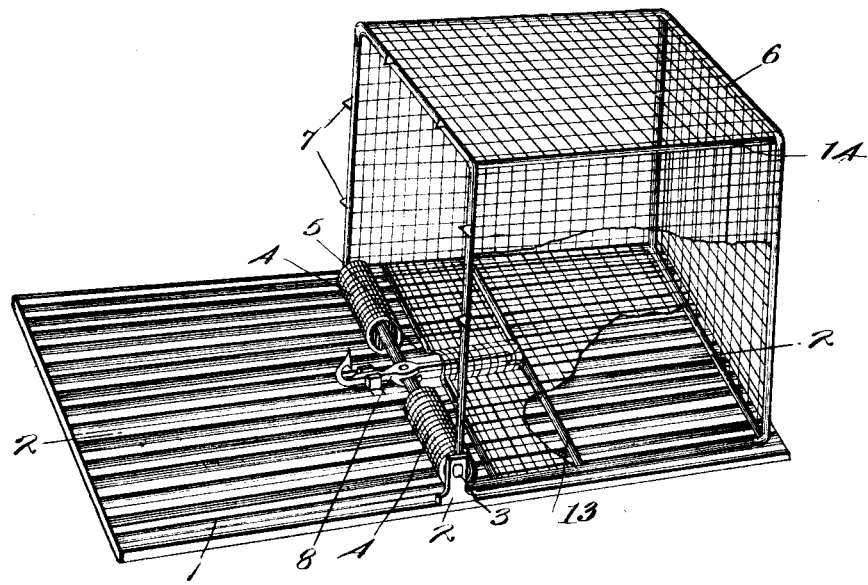
Figure 2:
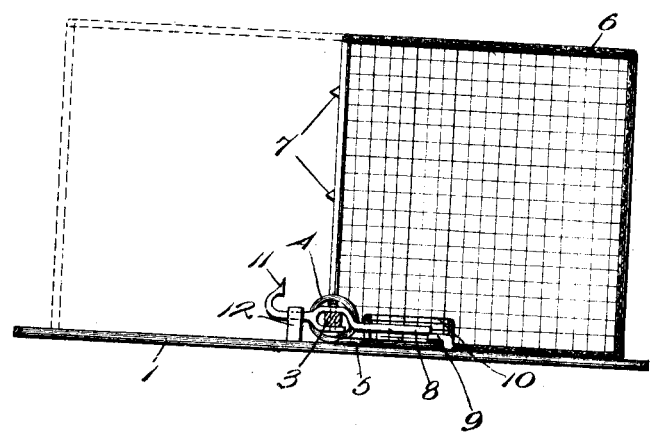

In the accompanying drawings forming a part of this application, and in which similar reference symbols indicate corresponding parts in the several views—Figure 1 is a perspective view, showing my improved trap in set position; and Fig. 2 is a longitudinal vertical section of the construction shown in Fig. 1.

Referring to the drawings—1 indicates a base which is preferably formed of corrugated metal and provided with ears 2 for rigidly supporting a cross-bar 3. A pair of spiral springs 4 are shown encircling said cross-bar 3 with their inner ends 5 confined against the base 1. A cage 6 is provided with an open end, and with a stiffening frame 14 supported on the free ends of said spring 4; teeth 7 projecting from the perimeter of such open end in position for entering the depressions of said corrugated base in the sprung position of the cage.

A trigger device 8 is pivoted on the cross-bar 3 in position for engaging an exterior lug 9 formed integrally with a cross member 13 secured to the cage frame 14; the adjacent wall of said cage being depressed at 10 to escape interference with said trigger device. The trigger device is provided with a hooked bait retaining portion 11 positioned between stops 12 on said base for limiting the swing of said device.

In the operation of my invention, the cage is swung against the tension of the springs 4 into set position, as shown in Figs. 1 and 2, and the pivoted trigger 8 shifted into engagement with the upper surface of the lug 9; the hooked portion 11 of said trigger being previously baited. In this set position of the trap, the trap will be sprung by shifting of the pivoted trigger 8 from above the lug 9 by efforts of an animal to drag the bait from the hooked portion 11 of said trigger, whereupon the springs 4 will forcibly swing the trap to its closed, or sprung, position, as indicated by broken lines in Fig. 2.

I claim:—

1. A trap comprising a base, a cross-bar rigidly mounted thereon, spiral springs encircling said bar with one end engaging said base, a cage carried on the free ends of said springs and provided with an open end, a lug on the exterior of said cage, a trigger device pivoted on said cross-bar for engaging said lug to lock the cage in set position, and stops on said base for limiting the swing of said pivoted trigger device.

2. A trap comprising a corrugated base, a cross-bar thereon, springs encircling said bar with one end engaging said base, a cage carried on the free ends of said springs and provided with an open end, teeth projecting from the perimeter of such open end for entering the depressions of said corrugated base in the sprung position of said cage, and a trigger device carried by said cross-bar for locking said cage in set position.

In testimony whereof, I affix my signature, in presence of two witnesses.

HARRY A. THIBERGE.

Witnesses:
　ESMOND PHELPS,
　S. MÜLLER.